(12) United States Patent
Hillier et al.

(10) Patent No.: US 8,866,873 B2
(45) Date of Patent: Oct. 21, 2014

(54) SYSTEM FOR DISTRIBUTING VIDEO CONFERENCE RESOURCES AMONG CONNECTED PARTIES AND METHODS THEREOF

(75) Inventors: Peter Matthew Hillier, Ottawa (CA); Patrice Arruda, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 197 days.

(21) Appl. No.: 13/317,088

(22) Filed: Oct. 8, 2011

(65) Prior Publication Data

US 2013/0088564 A1 Apr. 11, 2013

(51) Int. Cl.
*H04N 7/15* (2006.01)
*H04L 12/18* (2006.01)

(52) U.S. Cl.
CPC .................................. *H04L 12/1822* (2013.01)
USPC .................. 348/14.08; 348/14.09; 348/14.12; 370/260

(58) Field of Classification Search
USPC .............................. 348/14.01–14.16; 709/204
See application file for complete search history.

(56) References Cited

U.S. PATENT DOCUMENTS

| | | | |
|---|---|---|---|
| 2002/0136298 A1* | 9/2002 | Anantharamu et al. | . 375/240.12 |
| 2006/0104347 A1 | 5/2006 | Callan et al. | |
| 2008/0043645 A1 | 2/2008 | Anson et al. | |
| 2010/0149306 A1* | 6/2010 | Gopal et al. | ............... 348/14.09 |
| 2011/0137993 A1* | 6/2011 | Yi et al. | ........................ 709/204 |

FOREIGN PATENT DOCUMENTS

WO    WO 2005/004481 A1    1/2005

OTHER PUBLICATIONS

Fu et al., "Novel Signaling System for Multiparty Sessions in Peer-to-Peer Ad Hoc Networks" IEEE Communications Society/WCNC 2005; pp. 2287-2292.

* cited by examiner

*Primary Examiner* — Melur Ramakrishnaiah

(57) ABSTRACT

The present disclosure relates to a system for distributing video conference resources among connected parties and methods thereof. In an illustrative embodiment, an ad-hoc network providing conferencing resources is presented. The network can include a master device and a number of slave devices. Each of the slave devices can present their bandwidth capabilities to the master device. End devices can be connected to the master device. When no additional connections can be made to the master device, slave devices can be used to add the end devices into the conference. The slave device can thus share its resources to the conference. In one embodiment, individual slave devices can handle different types of codecs.

11 Claims, 4 Drawing Sheets

SYSTEM FOR DISTRIBUTING VIDEO CONFERENCE RESOURCES AMONG CONNECTED PARTIES AND METHODS THEREOF

TECHNICAL FIELD

This disclosure generally relates to communications, and more particularly, to conferencing solutions that take advantage of connected resources.

BACKGROUND

Voice over Internet Protocol (VoIP) phones provide the ability to conference multiple parties together. Low end video conferencing devices have numerous limitations including the number of devices that they can connect with and the number of simultaneous coders-decoders ("codecs") they support. To overcome these challenges, businesses have opted to purchase larger capacity conferencing systems that have additional ports on them.

Alternatively, conference devices have been chained together to incorporate a number of users. For example, a first set of users would call into a conference operated by a first user. A second set of users would then call into a conference operated by a second user. To connect them together, the second user would dial into the conference operated by the first user. Effectively, the conference managed by the first user and the conference managed by the second user are interconnected to each other to create a combined conference.

Some systems do not have sufficient resources to support multiple codecs. To overcome these processing limitations, the first party into the conference often negotiates the codec that will then become the only supported codec for additional users. By locking the conference to a single codec, significant resources are saved.

With rapid advancements in mobility and the plethora of communication devices, however, forcing the use of a single codec within the communication network is becoming impossible. The network and all devices which access it have to be under the full control of the IT domain. Enterprise concepts such as Bring Your Own Device (BYOD), open networks, and a massive surge in third party applications make it difficult for IT groups to force restrictions onto groups of users.

A need therefore exists for a system for distributing video conference resources among connected parties and methods thereof that overcome those issues described above. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to conference devices, and more particularly, to a system for distributing video conference resources among connected parties and methods thereof. In an illustrative embodiment, an ad-hoc network providing conferencing resources is presented. The network can include a master device and a number of slave devices. Each of the slave devices can present their capabilities to the master device, for example, coders-decoders ("codecs"), number of ports, available bandwidth, etc. End devices can be connected to the master device. When additional connections cannot be made to the master device, slave devices can be used to add the end devices into the conference. The slave device can thus share its resources to the conference. In one embodiment, slave devices can handle different types of codecs.

Numerous advantages can be offered by the illustrative embodiment described above. The ad-hoc network can provide a low end conferencing solution that has the potential of reducing resources carried by a single device by taking advantage of connected resources. In addition, a single conference between multiple parties can be provided where users can dial the same number into the master device with the master device redirecting connections to other devices to maximize the resources of the collective. Despite limits within the conference master, the conference can grow to an unlimited size depending on an available resource pool presented by the slave devices. Limits of transcoding on the conference master can be negotiated through the slave devices and callers can be directed to attached resources supporting the required transcoding. Unlike previous capability exchange models, this disclosure offers resources of the collective and if required, routes new connections through these resources using a dynamic peer-to-peer "connected state" model rather than fixed network resources. Many additional advantages of the present disclosure will become apparent to those skilled in the relevant art as provided for in the following description.

Figure 1:
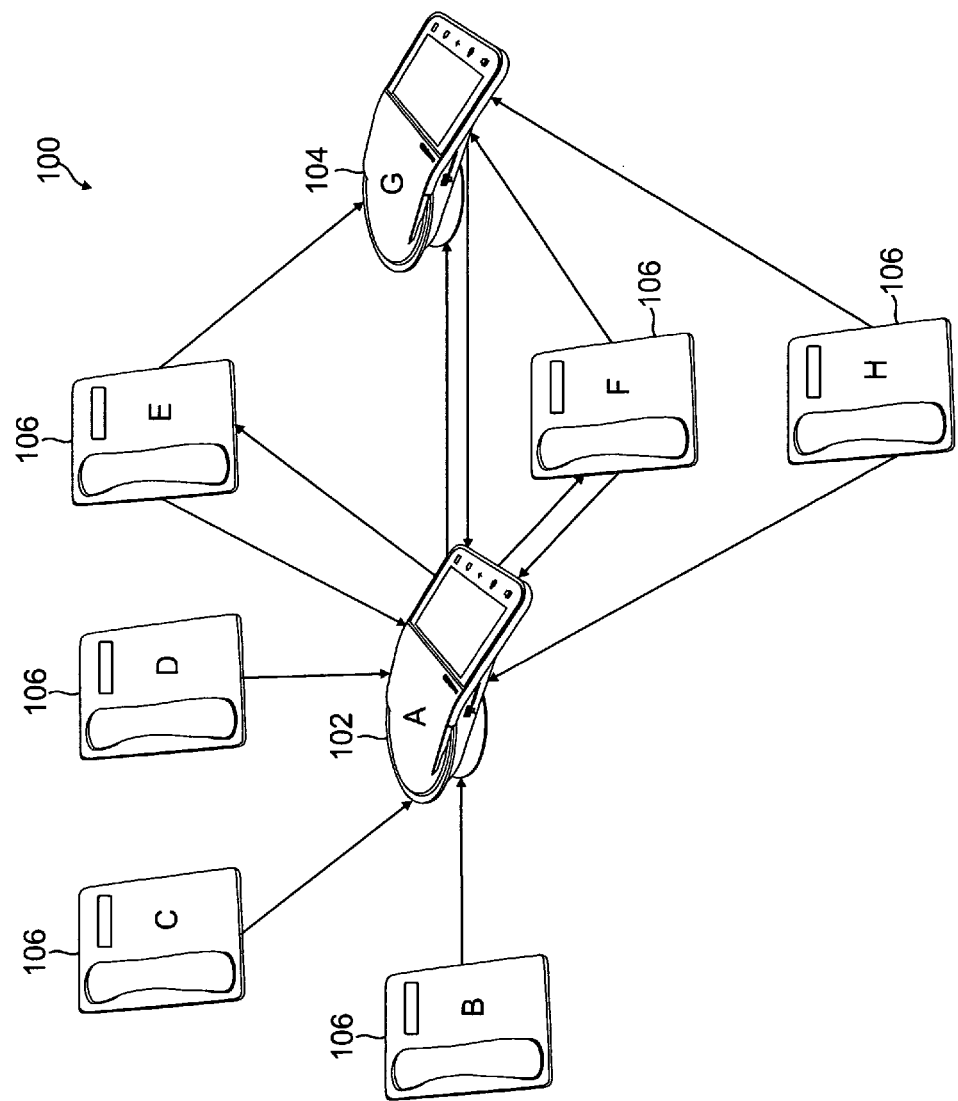
FIG. 1 is an exemplary block diagram depicting an ad-hoc network of conference devices sharing resources in accordance with one or more aspects of the present disclosure.

Turning to FIG. 1, an exemplary block diagram depicting an ad-hoc network 100 of conference devices 102, 104 and 106 sharing resources in accordance with one or more aspects of the present disclosure is provided. While a single master device 102 has limitations, it can be connected to other slave devices 104 who offer services. Effectively borrowing from the connected slave devices 104 can create an even larger virtual pool of resources. The slave devices 104 and master device 102 can exchange resource information and leverage it in the context of the ad-hoc real time network 100 created by the interconnection of these devices.

The conference devices 102, 104 and 106 can communicate through at least one network. The components can be connected to the network, and thereby to each other, through logical connections. Each device 102, 104 and 106 can have a processor for implementing logic, memory, display and input device. The memory generally includes both volatile memory, such as RAM, and non-volatile memory, such as ROM, flash memory, or the like. The master device 102 and slave device 104 can maintain a number of communication ports. These ports can be used for communications between the master device 102, slave device 104 and end devices 106. Ports on the master device 102 can be reserved specifically for slave devices 104.

The master device 102 can setup the conference by processing requests from the end devices 106, slave device 104 or any other component within the ad-hoc network 100. Users themselves can operate the master device 102. In one embodiment, the master device 102 can have both video and audio ports. These ports can be used to connect with end devices 106 directly. As provided in the ad-hoc network 100, the number of connections to the master device 102 can be limited. When each of the video ports has been used, the remaining end devices 106 can be connected with an audio port.

A conference application can be implemented within the master device 102. In the ad-hoc network 100 of FIG. 1, the master device 102 can manage bandwidth capabilities. The application within the master device 102 can keep track of resources offered by the slave devices 104 and codecs used thereon. The information managed by the application can also be used to keep track of the total number of audio and video ports as well as the availability of them.

The master device 102 can support authentications such as communications from end devices 106 as well as slave devices 104. General data encryption can also be provided by the master device 102. Conventional Ethernet technology or internal or external modems can serve as the network interfaces for the conference devices 102, 104 and 106. Network modems (such as cable, DSL, ADSL, or dial up) can be used as a network interface. The conference devices 102, 104 and 106 can include conference identifications and passcodes to enter into the conference.

In one embodiment, the end device 106 or slave device 104 that first connects with the master device 102 can establish the codec, which the master device 102 can use with other connections. Alternatively, the master device 102 has a preset codec. When other end devices 106 are seeking to enter into the conference, and they do not operate under the same codec initially setup, they can establish communications through a slave device 104 that support their codec. As will become apparent below, more than one slave device 104 can be used for different codecs.

The slave device 104 can be used for providing additional resources. The slave device 104 can have a number of capabilities and can link with other slave devices 104 to extend the conference. Exchange of information between the slave devices 104 and the master device 102 can take place. The slave device 104 can broadcast its abilities to the master device 102. Information about its communication ports and which codec it currently uses can be provided to the master device 102.

Figure 2:
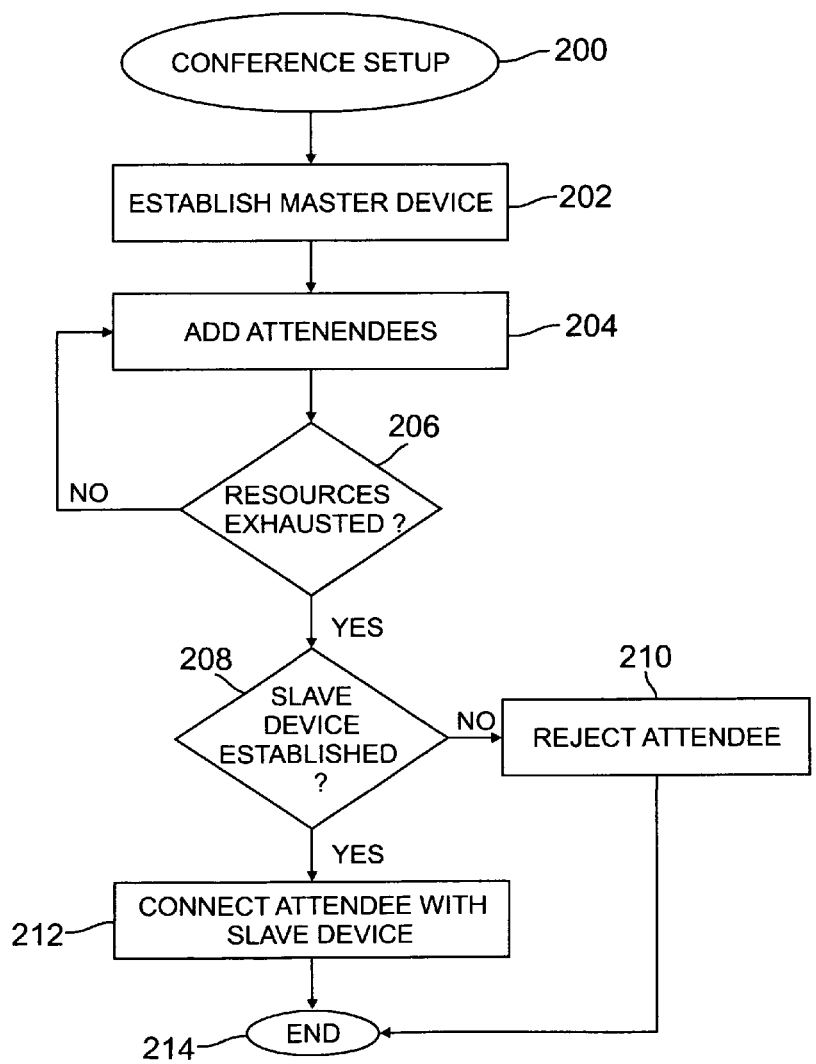
FIG. 2 is an illustrative flow chart showing exemplary processes for setting up a conference in accordance with one or more aspects of the present disclosure.

To further illustrate the distribution of conference resources, the ad-hoc network 100 provided in FIG. 1 has end devices B, C, D, E, F and H 106 with master device A 102 and slave device G 104. One skilled in the relevant art will appreciate that fewer or more components can be provided within the ad-hoc network 100. Master device A 102 and slave device G 104 can have four ports for video and eight ports for audio. End devices B, C, D, E, F and H 106 can have a single port that allows for video stream capabilities and an associated single port for audio. FIG. 2 is an illustrative flow chart showing exemplary processes for setting up a conference in accordance with one or more aspects of the present disclosure. The processes can begin at block 200. At block 202, master device A 102 can be established. Establishing master device A 102 can include designating a conference device to handle communications within the conference.

Generally, a finite number of end devices 106 can be connected with master device A 102. Attendees can begin calling master device A 102 through end devices B, C, D and E 106 by dialing DN 5000. Their end devices 106 can be added to the conference supported by master device A 102 at block 204. At decision block 206, master device A 102 can determine whether its resources have been exhausted. If additional resources are available, more attendees can be added at block 204.

When resources are exhausted for master device A 102, however, additional resources can be sought by determining whether a slave device 104 has been established at decision block 208. The number of end devices 106 can exceed the capability of the bridge of master device A 102. The result can be more video stream requests than the conference supports and that master device A 102 can handle.

Slave device G 104 having DN 6000 can have the same properties as master device A 102. If a deadlock occurs, slave device G 104 can connect to master device A 102 to offer its resources. Prior to establishing a connection with slave device G 104, master device A 102 can reject the last connection with an end device 106 in favor of a device with expanded resources. This rejection scheme can be priority based, for example, last in first out. Typically, the conference application determinates available resources and releases an end device 106 that can be reconnected using the capabilities of the slave device 104.

In one embodiment, master device A 102 can determine whether to reject any new end devices 106 through a conference booking tool. This tool can provide the application operating on master device A 102 knowledge in advance whether slave device G 104 has accepted the conference booking. Alternately, the bridge of master device A 102 can leave one extra port open for signaling with no expectation of ever establishing a full call on that port.

If slave device G 104 is not connected, a video connection request can simply be downgraded to an audio connection request if available on master device A 102. As shown in FIG. 1, end devices B, C, D and E 106 are connected into the conference. End devices B, C, D and E can call master device A 102 at DN 5000 and negotiate a video connection. This exhausts master device A's 102 video capabilities. When end device F 106 calls, a video connection cannot be established and the user is connected via audio only. When no available resources can be provided by master device A 102 and slave device G 104 has not been setup, the extra attendee is rejected at block 210. The processes can end at block 214.

Slave device G 104 can provide its capabilities to master device A 102. Nevertheless, master device A 102 has no available video port to which to connect with slave device G 104. In one embodiment, the conference application on master device A 102 can elect to move the video connection of end device E 106 over to slave device G 104 in order to free up a conference port on master device A 102.

The attendee can connect with slave device G 104 when it has been established at block 212. Because slave device G 104 took up the last video connection to master device A 102, end device E 106 can be reconnected through slave device G 104. Other connected end devices 102 can also be reconnected. Using the SIP protocol as an example, this can be done by transferring end device E 106 to slave device G 104. The conference application on master device A 102 can provide advance warning to the conference application on slave device G 104 to expect the call from end device E 106 such that slave device G 104 can automatically accept the incoming call from end device E 106 when it arrives. In one embodiment, master device A 102 can automatically transfer the connection without end device E 106 calling slave device G 104. An open source protocol such as SIP, which is emerging as the standard to connect video to disparate sources, can be used without modification to directly facilitate this.

As soon as the video port becomes available on master device A 102, due to the transfer of end device E 106, master device A 102 can accept a request from slave device G 104 to connect video and audio. At this point, end devices A, B, C and D 106 and slave device G 104 are in a direct video conference with master device A 102, while end device E 106 is connected to slave device G 104 and mixed through slave device G 104 to master device A 102.

As provided in FIG. 1, end device F 106 can call into master device A 102 by dialing DN 5000. The conference application on master device A 102 can be aware that resources are available through slave device G 104 and that its own resources have been exhausted. Master device A 102 can thereafter redirect the call from end device F 106 to slave device G 104. The processes for setting up the conference can end at block 214.

Figure 3:
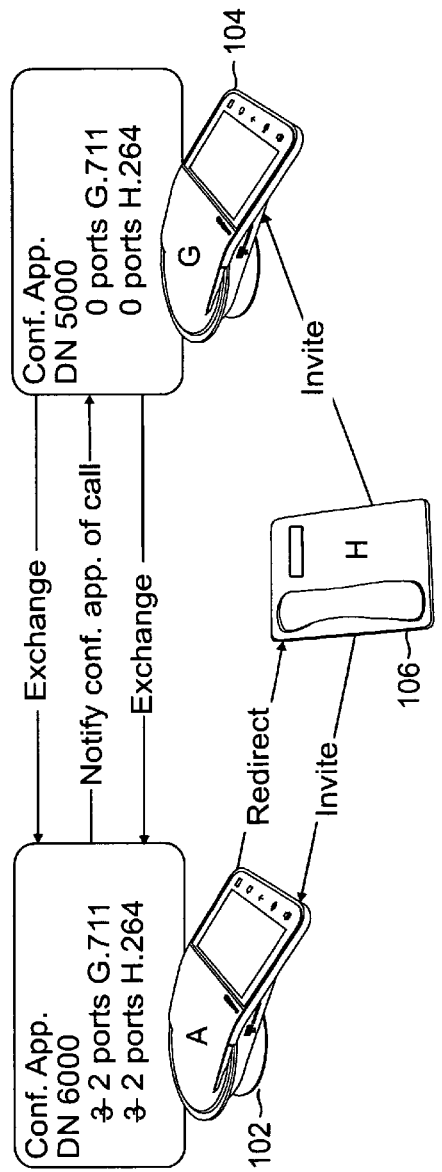
FIG. 3 is an exemplary block diagram showing how a conference application can be incorporated into the ad-hoc network to control resources in accordance with one or more aspects of the present disclosure.

Referring now to FIG. 3, an exemplary block diagram showing how a conference application can be incorporated into an ad-hoc network 100 to control resources in accordance with one or more aspects of the present disclosure is provided. Upon establishing a connection with slave device G 104, master device A 102 can receive additional resources. When end device H 106 calls master device A 102, master device A 102 has no additional video conferencing ports remaining as end devices B, C and D 102 and slave device G 106 have filled them. Through slave device G 104, however, the conference application detects three additional audio ports, G.711, and three video ports, H.264, available on slave device G 104.

For purposes of illustration, an SIP protocol can be used. A higher layer application residing on top of the SIP stack can be available on both master device A 102 and slave device G 104. Slave device G 102 can offer its resources. This application can exchange resource availability such that the application on the master device 102 can use the SIP message "302 Moved Temporarily" to forward incoming calls to devices 104 with available resources.

Continuing with the illustration provided in FIG. 3, end device H 106 can contact the conference bridge established by master device A 102 through an invite request. Master device A 102 can redirect end device H 106 to the conference bridge setup by slave device G 104. The conference identification and passcodes, for simplicity, can be exchanged between master device A 102 and slave device G 104. When resources are distributed, master device A 102 can handle ports and connected end devices 106. A second invite request can be made by end device H 106 to slave device G 104.

In one embodiment, the challenge can be made initially on master device A 102, and upon acceptance of the call, can be redirected to slave device G 104 having available resources. Alternatively, the passcode can be passed to slave device G 104 at the application layer, and then the new call redirected from master device A 102 can be challenged. Slave device G 104 can know the call is coming from master device A 102 via the nature of the SIP protocol or slave device G 104 can be informed by master device A 102 to expect the call from the redirected device through notification.

When end device H 106 is connected, slave device G 104 can exchange information about its connection. Slave device G 104 can update available resources on master device A 102. For example, data on master device A 102 can indicate that there are now two G.711 ports and H.264 ports for audio and video. Those skilled in the relevant art will appreciate that the behavior of the conference application can be widely interpreted. The application on master device A 102 can keep open an audio and video port in order to challenge callers for conference identifications and passcodes. In one embodiment, the conference identifications and passcodes are transmitted to slave device G 104, and redirected callers can be prompted. Alternatively, the conference does not require passcodes.

In one embodiment, the conference application on the master device 102 can create a callback list. This list can be created based on the incoming calls that are rejected due to insufficient resources. When a resource laden device finally makes a connection, the master device 102 can recall the rejected end devices 102 and then transfer them to the slave device 104. The conference application on the master device 102 can contact the application on the rejected device 106 and instruct it to call the slave device 104. The purpose of the list is to manage resources and calls such that full saturation of the connection mesh composing the conference can be achieved. Typical queuing models can be applied to the callback list. For example, the rejected devices' required resources can be used as part of the decision process on which device to callback. Furthermore, the available resources on the rejected device can also be considered as this could satisfy the collective needs of even more rejected devices. Devices with more resources, or specific resources required by other rejected devices, can be given priority since their inclusions can result in significantly more connections being allowed.

Figure 4:
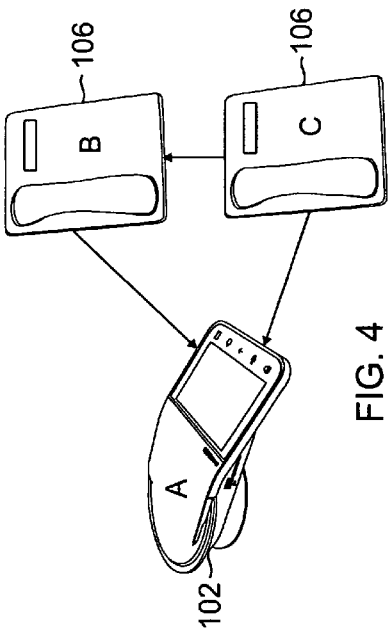
FIG. 4 is an exemplary block diagram depicting a device being assigned to a slave device supporting a specific codec in accordance with one or more aspects of the present disclosure.

Beforehand, slave devices 104 were added into the ad-hoc network 100 to introduce additional resources. FIG. 4 is an exemplary block diagram depicting an end device 106 being assigned to a slave device 104 supporting a specific codec in accordance with one or more aspects of the present disclosure. Expanding beyond the typical limitation of ports, transcoding is a huge performance impact to conference devices 102, 104 and 106. A conference application, such as that described above, can be used to optimize transcoding.

For purposes of illustration, master device A 102 can provide a four port video conference supporting a H.264 codec. Master device A 102 can be capable of only handling video using H.264. End device B 106 is video capable and has three H.264 ports. End device B 106 can also support codec XYZ. In the provided illustration, end device B 106 can call master device A 102 and establish a video connection using H.264.

End device B 106 can advertise that it has conference ports available and that it understands additional codecs including XYZ.

End device C 106 can then call master device A 102 and request to use codec XYZ as its preference or XYZ is the only codec that end device C 106 supports. Using the same functionality described above, the call from end device C 106 can be redirected to end device B 106, which can support XYZ. The end result is that master device A 102 can receive a local audio stream and an H.264 video stream from end device B 106. End device B 106 can manage its own H.264 stream to master device A 102 while transcoding and mixing end device C 106 into that stream.

Master device A 106 can now have resources available to handle more calls, and should any of those calls require codec XYZ, that device can be redirected to end device B 106 as end device B 106 is already transcoding XYZ to H.264. End device B 106 can be optimized to keep its local camera input as XYZ in order to optimize mixing all three signals without transcoding first. Input streams from end devices B and C 106 can use XYZ. In this manner, transcoding happens only on egress for the stream going to master device A 102. On the stream from master device A 102, transcoding can be performed once from H.264 to XYZ and then presented to end device B 106. The stream can then be provided to end device C 106. Post transcoding on egress and pre-transcoding on ingress from master device A 102 can reduce overhead.

Figure 5:
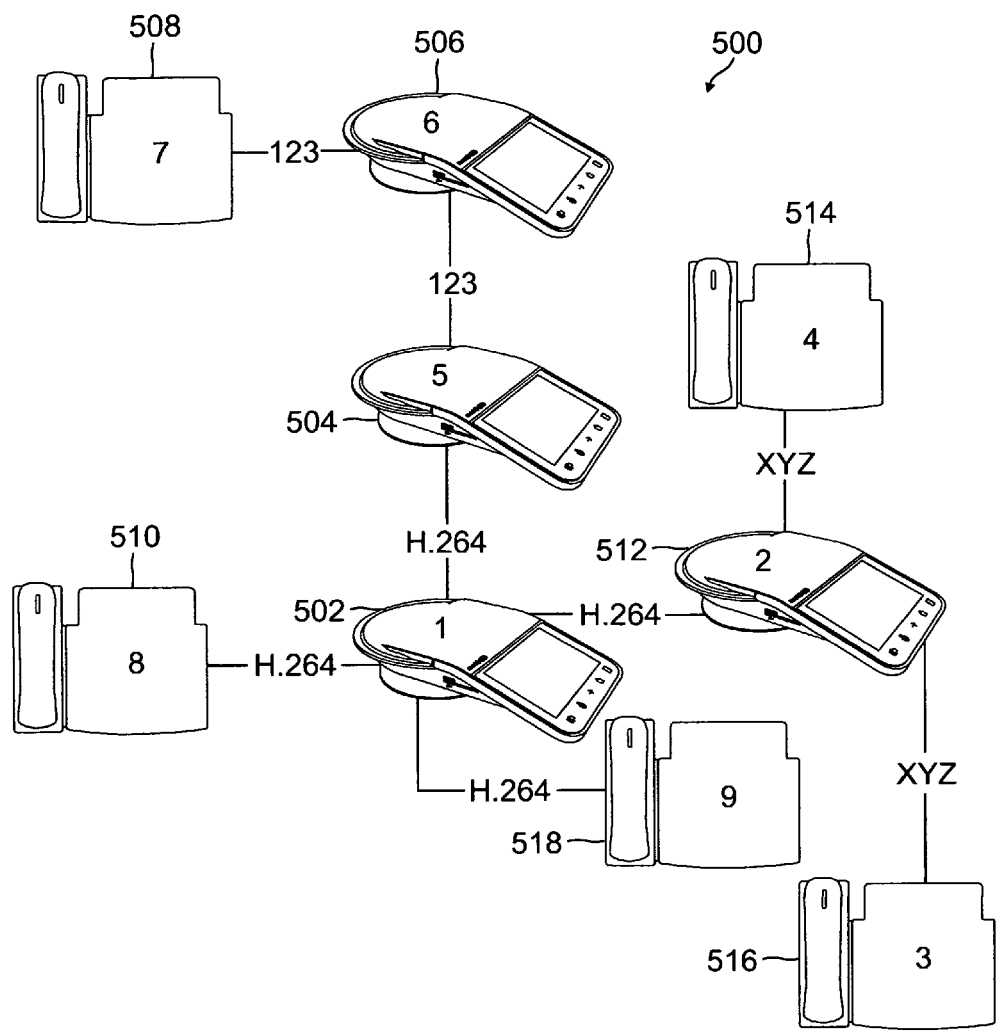
FIG. 5 is an exemplary block diagram showing multiple codec groups in accordance with one or more aspects of the present disclosure.

Turning to FIG. 5, an exemplary block diagram showing multiple codec groups in accordance with one or more aspects of the present disclosure is provided. A conference cloud 500 supporting H.264, XYZ and 123 codecs is shown. Other codecs can be supported within the cloud 500. Conference slaves 504, 506 and 512 can offer a particular codec and allow several connections of this type. Streams from its connections can be mixed on the conference node and a single stream can be transcoded to the codec used by its connection into the conference. When the master 502 sees a new incoming call requesting the codec operated by the slaves 504, 506 and 512, the call can be redirected to the proper conference slave 504, 506 and 512 running that codec. This can allow the conference master 502 to support only one codec across all connections, but multiple codecs within the conference collective.

Master device 1 502 can have four ports of H.264. To limit the amount of processing, master device 1 502 can restrict itself to handling H.264. Master device 1 502 can be connected to device 2 512, device 5 504, device 8 510 and device 9 518. Device 2 512 can conserve resources by taking streams from itself, device 3 516 and device 4 514. The streams can be mixed in XYZ and transcoded to H.264. Homogenous input XYZ allows transcoding on egress after mixing. Device 5 504 can support two ports of video and codecs H.264 and 123. Device 6 506 connected to device 5 504 can support four ports of video only of type 123. The conference cloud 500 managed by master device 1 502 can be capable of sub-ending device 7 508 off of device 6 506 to offset limitations of device 5 504. This can be one implementation of "nested" resourcing.

FIG. 5 emphasizes that, by having the conference application, direct connections to the correct transcoding point can provide significant improvement in resource utilization by master device 1 502. Similar to redistributing calls when additional ports appear, calls that are using transcoding resources on master device 1 502 can be redirected and reconnected when a more suitable device appears.

One skilled in the relevant art will appreciate that resource availability can be expanded or adapted to address failure scenarios. For example, if device 7 508 fails, callers can be reconnected to available resources on master device 1 502. This can simply be viewed as a normal use case where device 7 508 drops off the call, and parties connected to device 7 508 can be reconnected to master device 1 502. If insufficient resources exist on master device 1 502, calls can be dropped based on a priority scheme, or simply a first come first serve basis. Generally, it is the task of the conference application managing the resources on master device 1 502 to attempt to insure resources in the combined conference network are utilized before rejecting or dropping calls.

The data structures and code, in which the present disclosure can be implemented, can typically be stored on a non-transitory computer-readable storage. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system comprising:
   a master device having a first type of codec; and
   a slave device connected to said master device and having a second type of codec, said slave device being configured to transcode communications in said second codec to said first codec for exchange with said master device,
   wherein said master device is configured such that upon receipt thereby of a request to exchange communications, from an end device having said second type of codec, said request is redirected by said master device to said slave device, and said slave device is configured to connect with said redirected end device and to transcode communications from said redirected end device in said second codec to said first codec for exchange thereby with said master device.

2. The system of claim 1, wherein said first and second types of codec are different.

3. The system of claim 1, comprising at least one end device connected to said master device having said first codec.

4. The system of claim 1, wherein redirecting said request to said slave device comprises notifying said slave device of an expected call from said end device having said second type of codec.

5. The system of claim 4, wherein redirecting said request to said slave device comprises notifying said end device having said second type of codec to call said slave device.

6. The system of claim 1, wherein said slave device mixes communications in said second codec from a plurality of end devices and converts said communications to said first codec.

7. A master device having a first type of codec comprising:
   at least one processor; and
   a memory operatively coupled to said processor, said memory storing program instructions that when executed by said processor, causes said processor to:
   connect with an end device having said first type of codec;
   exchange communications with said end device having said first type of codec;
   connect with a slave device having a second type of codec, said slave device being configured to connect with an end device having said second type of codec and to transcode communications in said second codec to said first codec for exchange thereby with said master device;
   exchange communications with said slave device; and
   redirect a request to exchange communications, from an end device having said second type of codec, to said slave device such that said slave device can connect with said redirected end device and transcode communications therefrom in said second codec to said first codec for exchange with said master device.

8. The master device of claim 7, wherein said memory storing program instructions, when executed by said processor, causes said processor to remove said connection with said slave device.

9. The device of claim 7, configured to connect with said slave device having said second type of codec by being configured to receive bandwidth capabilities of said slave device.

10. The master device of claim 7, configured to connect with said end device having said first type of codec by being configured to decline said end device to a video connection and provide an audio connection.

11. A device comprising:
    at least one processor; and
    a memory operatively coupled to said processor, said memory storing program instructions that when executed by said processor, causes said processor to:
    connect with at least one end device having a first codec;
    link with at least one slave device having a second codec; and
    exchange communications with said at least one slave device that transcodes communications in said second codec to said first codec, wherein connecting with said at least one end device having said first codec comprises declining said at least one end device to a video connection and providing an audio connection.

* * * * *